United States Patent [19]
Combs

[11] Patent Number: 4,779,685
[45] Date of Patent: Oct. 25, 1988

[54] ANNULAR RING APPARATUS AND METHOD FOR WEEDING OR CULTIVATING

[76] Inventor: Kenneth A. Combs, 145 W. Calle Concordia, Tucson, Ariz. 85704

[21] Appl. No.: 936,581

[22] Filed: Dec. 1, 1986

[51] Int. Cl.$^4$ ............................................. A01B 1/12
[52] U.S. Cl. ..................................................... 172/380
[58] Field of Search .............. 172/371, 372, 375, 378, 172/379, 380, 381; D8/6, 9, 11, 13

[56] References Cited

U.S. PATENT DOCUMENTS

| | | | |
|---|---|---|---|
| 74,987 | 3/1868 | Butlers | 172/379 |
| 492,364 | 2/1893 | Powers | 172/372 |
| 791,623 | 6/1905 | Holmes | 172/380 |
| 1,105,760 | 8/1914 | Dahl | 172/375 |
| 1,167,971 | 1/1916 | Birn | 172/371 |
| 1,317,596 | 9/1919 | Sanders | 172/375 |
| 1,469,957 | 10/1923 | Rich | 172/372 |
| 1,500,271 | 7/1924 | Rumbaugh | 172/371 |
| 1,650,463 | 11/1927 | Pitts | 172/371 |
| 1,683,395 | 9/1928 | Oakland | 172/360 |
| 1,886,560 | 11/1932 | Lee | 172/375 |
| 1,954,250 | 4/1934 | Lee | 172/375 |
| 1,967,976 | 7/1934 | Smith | 172/378 |
| 2,022,561 | 11/1935 | Gray | 172/372 |
| 2,134,070 | 10/1938 | Avant | 172/371 |
| 2,184,968 | 12/1939 | Woodruff | 172/380 |
| 2,201,436 | 5/1940 | Jones | 172/380 X |
| 2,587,106 | 2/1952 | Brown | 172/349 |
| 2,752,839 | 7/1956 | Robertson | 172/375 |
| 2,839,982 | 6/1958 | Noell | 172/381 |
| 2,936,032 | 5/1960 | Muir | 172/380 |
| 3,623,556 | 11/1971 | Adams | 172/371 |
| 4,334,583 | 6/1982 | Parker | 172/375 |

FOREIGN PATENT DOCUMENTS

| | | | |
|---|---|---|---|
| 855968 | 11/1970 | Canada | 172/375 |
| 2113981 | 10/1972 | Fed. Rep. of Germany | 172/375 |
| 636484 | 4/1928 | France | 172/375 |
| 886673 | 1/1962 | United Kingdom | 172/375 |

*Primary Examiner*—Richard T. Stouffer
*Attorney, Agent, or Firm*—Cahill, Sutton & Thomas

[57] ABSTRACT

A weeding tool includes a long metal handle and a metal head attached to the lower end of the handle. The head includes a metal annular, planar ring, the periphery of which includes a plurality of spaced trapezoidal teeth. The entire peripheral edge of the ring is sharpened, and the entire circular inner edge of the annular ring also is sharpened. A pair of cross-braces attach the ring to the lower end of the handle. The tubular metal member and the handle are inclined at an angle of approximately 38 degrees to the plane of the ring. In use, the annular ring is placed on a ground surface and the handle is raised or lowered to aim the front or rear portion of peripheral edge into the ground. As the front edge portion of the ring is pushed into and forward through the soil, it passes over the edge of the ring and through the opening in the ring. Roots of weeds are cut beneath the ground surface by the sharp front edge as the rear peripheral edge of the ring is pulled through the soil in the manner of using a hoe the roots of weeds are cut beneath the soil surface, and the surface soil passes over the ring and through its hole. The hole, surrounded by the annular ring, results in greatly reduced resistance to movement of the ring through the earth, and results in much less disruption of the surface layer of soil than is the case if a conventional hoe or other weeding implement is used.

7 Claims, 1 Drawing Sheet

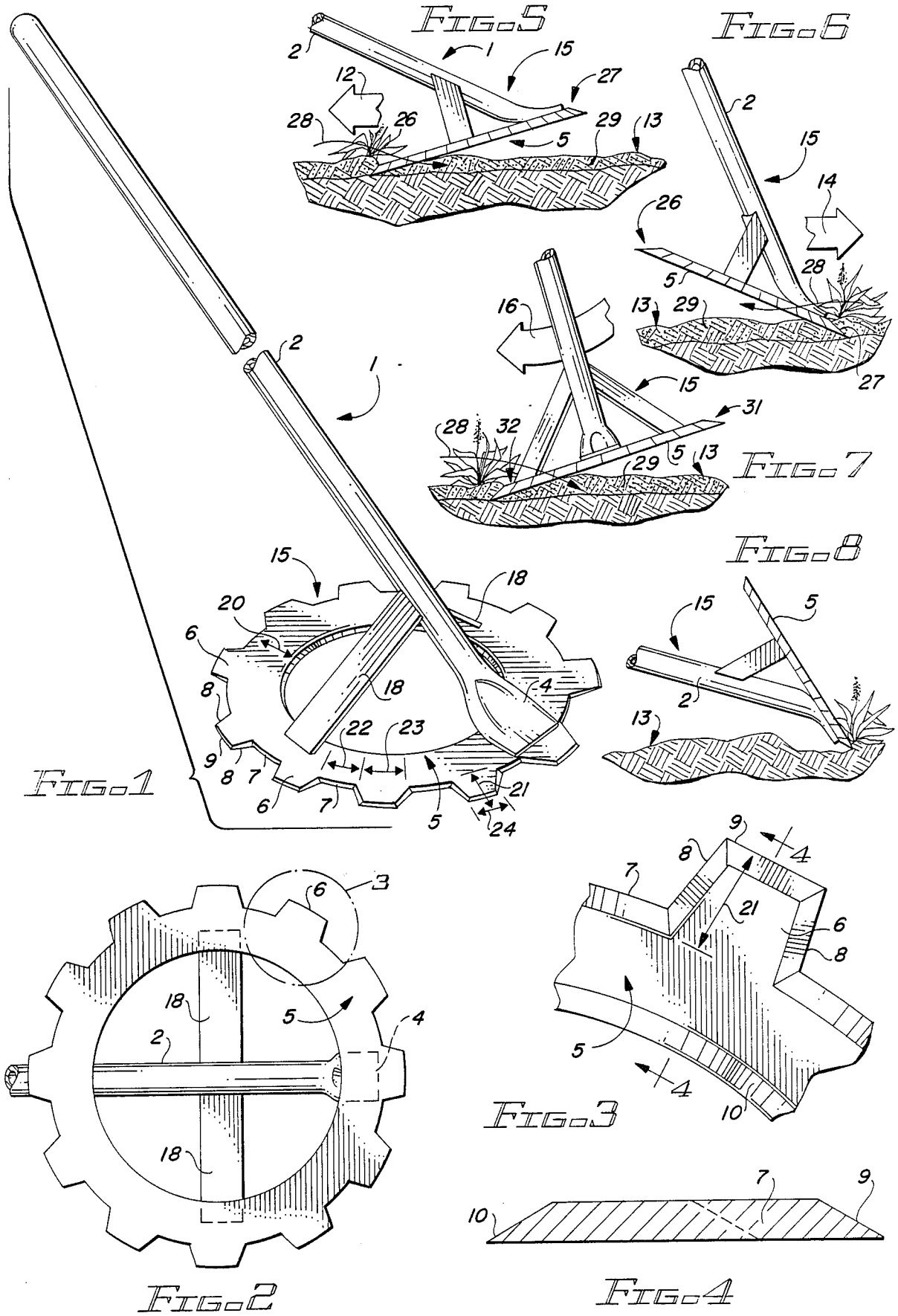

ANNULAR RING APPARATUS AND METHOD FOR WEEDING OR CULTIVATING

BACKGROUND OF THE INVENTION

The invention relates to weeding implements, particularly those having a long handle and adapted to cut roots of weeds below the ground surface of soil.

A wide variety of weeding/cultivating implements have been devised. U.S. Pat. Nos. 1,317,596, 1,500,271, 1,683,395, 1,886,560, 1,967,976, 2,587,106, and 3,623,556, Canadian Pat. No. 855,968, French Pat. No. 636,484, and British Pat. No. 886,673 generally indicate the state-of-the-art. All of these devices are connected to long or short handles that are manipulated by a user to pull or push a metal cutting or cultivating head through soil to cultivate and/or move it. Some of the known devices slice weeds slightly beneath the soil surface as a sharp edge is pulled or pushed through the earth. All of the prior art devices have the objective of reducing the effort required in weed cutting and soil cultivation, but none of them accomplish these objectives to the extent that would be desirable. There remains an unmet need for a lightweight weeding/cultivating instrument that is easily pulled or pushed through soil ground below the surface thereof to cut weed roots and loosen the soil, but without greatly disrupting the location of the soil through which the cutting edge of the implement passes.

SUMMARY OF THE INVENTION

Accordingly, It is an object of the invention to provide a new and improved cultivating and weeding hand tool.

It is another object of the invention to provide an improved weeding/cultivating tool that can be easily moved through the soil without cutting weed roots below the ground surface without leaving deep cuts/trenches and the like in the soil.

It is another object of the invention to provide a lightweight hand tool of the type described above which is rugged in construction yet low in cost.

Briefly described, and in accordance with one embodiment thereof, the invention provides a weeding/cultivating device including an elongated shank, preferably in the form of a steel handle, having a metal cutting head that includes an annular ring having a sharpened outer peripheral edge with a plurality of sharpened teeth thereon. The plane of the annular ring is substantially inclined relative to the direction of the handle. An inner edge of the annular ring also is sharpened. In use, the handle can be grasped in the manner of using an ordinary hoe, and the cutting head placed on the ground. The upper end of the handle then is raised or lowered so that the plane of the annular ring is tilted slightly relative to the surface of the ground. The handle is then deployed to push the peripheral cutting edge into the ground and then move it parallel to the surface so as to loosen the soil and cut the roots of weeds beneath the surface. Alternately, the handle is deployed to tilt the cutting ring rearward and to then pull the portion of the sharp peripheral edge nearest the user through the soil toward the feet of the user. The sharp edge of the ring slices through the ground below the surface thereof, and the large hole surrounded by the annular ring allows the soil to easily pass over and around the annular ring and through the hole, greatly reducing the resistance that the ground produces against movement of the ring through the ground.

Effective cutting of the roots of weeds beneath the surface and loosening of the soil thereby is achieved with minimal force and effort by the user and with minimum dislocation of the surface soil.

BRIEF DESCRIPTION OF THE DRAWINGS

FIG. 1 is a perspective view of the weeding/cultivating tool of the present invention.

FIG. 2 is a partial bottom view of the device shown in FIG. 1.

FIG. 3 is an enlarged view of detail 3 of FIG. 2.

FIG. 4 is a section view taken along section line 4—4 of FIG. 3.

FIGS. 5–8 are partial side views that are useful in explaining alternate ways of using the weeding/cultivating tool of the present invention.

DESCRIPTION OF THE INVENTION

Referring now to the drawings, weed cutting/cultivating tool 1 includes an elongated handle 2, which preferably is composed of steel, and is approximately 60 inches long. A metal cutting/cultivating head 15 is attached to the lower end of handle 2. Cutting head 15 includes a generally annular, planar ring 5 that is attached to the inclined handle 2. The lower end portion of handle 2 and has attached thereto an enlarged tab 4. Ring 5 is attached to tab 4 which is welded to its upper surface. Ring 5 also is attached to inclined handle 2 by means of a unitary brace that includes a pair of opposed braces 18, each of which has an upper end welded to a side of handle 2 and a lower welded to the upper surface of ring 5.

The angle of inclination of handle 2 relative to the plane of ring 5 is approximately 38 degrees.

In accordance with the present invention, a plurality of peripheral, trapezoidal teeth 6 are provided along the entire outer peripheral edge of ring 5, and the entire outer peripheral edge 5 is sharpened. More specifically, the outer edge 9 and the sloped side edges 8 of each tooth 6 are sharpened. Also, each of the spaces 7 between adjacent teeth 6 also is sharpened. The entire circular inner edge 10 of ring 5 is sharpened.

In a presently preferred embodiment of the invention that I have constructed and tested, the inside diameter of ring 5 is five and three quarter inches. The width of the ring, indicated by distance 20, is five-eighths of an inch The length of each of the teeth 6, indicated by distance 21 in FIGS. 1, and 3 is three-sixteenths of an inch. The distance between the bases of adjacent teeth 6, indicated by distance 22 in FIG. 1, is approximately one-half of an inch, the width of the base of each of the teeth 6, indicated by reference numeral 23 in FIG. 1, is three-fourths of an inch, and the width of the top or outer portion of each tooth 6, indicated by distance 24, is one-half of an inch.

The inner and outer edges of ring 5 can be sharpened to a V-shaped point, as indicated in FIG. 4.

FIG. 5 illustrates one mode of using the tool 1. The upper end of handle 2 is lowered by the user so that the rearward inner edge 26 digs into the ground and the outer edge most distant from the feet of the user is raised, as indicated by reference numeral 27. The user then pulls the cutting head 15 toward his feet, in the direction of arrow 12. The sharp edge cuts the roots of the weed beneath the surface of the ground. As the sharp edge 26 moves through the ground, the surface soil moves over the ring and through the hole, taking the path indicated by arrow 28. Thus, the surface layer 29 of soil is loosened, but remains essentially where it was. Use of the tool 1 thus does not result in the digging of a trench or in substantial displacement of the soil, as would occur if an ordinary hoe or various other prior art device were used.

FIG. 6 illustrates another manner of using the device wherein the upper end of handle 2 is raised so that the rear edge 26 of ring 5 is raised and the forward edge 27 of cutting blade 15 cuts into the soil beneath the surface, and cuts the roots of weeds beneath the surface. Arrow 28 in FIG. 6 again indicates how earth passes through the opening surrounded by annular ring 5 and falls back into place nearly where it originally was, leaving a loosened layer 29 of earth.

FIG. 7 shows yet another mode of using the device 1 in a side-to-side fashion, wherein the right-hand edge 31 is raised, the left-hand edge 32 is lowered to dig into the ground, cut through roots of weeds beneath the surface, leaving a layer of loosened earth 29.

FIG. 8 illustrates how the cutting head 15 can be inverted so that the annular ring 5 is above the handle-receiving tube 3, allowing the device to be used to "scrape" the surface of the ground 13, if this is desirable.

In my use of the above-described weeding/cultivating tool 1, I have found that it is far more effective in removing most weeds than any other device that I have ever used. My tool can be manipulated in quite a variety of ways, as described above. Provision of the ring and large hole through it results in my device encountering much less resistance than most prior cultivating devices, making it much easier to use effectively. It loosens a surface layer of soil, cuts the roots of weeds below the surface, and hardly displaces the loosened dirt from its original location. The device 1 is useful for very shallow cultivating, skimming along the surface of the ground just below the surface, and also is very useful to dig two or three inches into the ground.

While the invention has been described with reference to one embodiment thereof, those skilled in the art will be able to make various modifications to the described embodiment without departing from the true spirit and scope of the invention. It is intended that all techniques which are equivalent to those described herein in that they perform substantially the same function in substantially the same way to achieve the same result are within the scope of the invention. For example, the handle 2 could be replaced by a member attaching the cutting head 15 to a tractor or the like to provide powered, rather than manual operation. The width of the annular ring can be considerably less than indicated in the drawings, as long as the ring is sufficiently rigid for the intended use. Furthermore, it is not necessary that the ring be circular, as long as it provides outer peripheral cutting edges and defines a large aperture through which the surface layer of the ground through which the outer peripheral cutting edges pass that are lifted, pass over the ring, and through the hole defined by the ring, and are redeposited on the surface of the ground.

I claim:

1. An apparatus for weeding and cultivating, comprising in combination:
   (a) a flat metal annular ring, wherein the ring has a flat planer upper surface and a flat planer lower surface, such that the ring defines a plane;
   (b) a peripheral outer edge of the ring, a plurality of teeth being disposed on the outer edge, the teeth being coplanar with the ring and oriented radially outwardly from the outer edge;
   (c) an inner edge of the ring, the inside diameter of the ring being substantially larger than the difference between the inside and outside diameters of the ring, wherein the entire peripheral edge of the ring, including the edges of the teeth, is sharpened, and wherein each of the teeth is integral with the ring, has an upper surface coplanar with the upper surface of the ring and a lower surface coplanar with the lower surface of the ring;
   (d) an elongated handle;
   (e) means attached to the upper surface of the ring for supporting the ring in fixed relationship to the handle for transmitting force from the handle to the ring to force the ring into the surface of the ground so that the teeth and the sharpened edge move generally parallel to the surface of the ground and cut through the ground beneath the surface thereof, cutting the roots of weeds, ground material through which the ring cuts passing through the opening defined by the ring and being redeposited on the ground, wherein the attaching means includes a flat metal brace including a pair of thin, elongated side members each having a lower end attached to an upper surface portion of the ring and an upper end portion attached to the handle, and wherein the angle between the handle and the plane of the ring is apporximately 38 degrees.

2. The apparatus of claim 1 wherein the entire inner edge of the ring is sharpened.

3. The apparatus of claim 1 wherein each of the teeth is generally trapezoidal in shape and is spaced from the adjacent teeth.

4. The apparatus claim 1 wherein the inner edge is sharpened and wherein the sharpened inner and outer edges are sloped downward from the upper surface to define a V-shaped peripheral cutting edge and a V-shaped inner cutting edge.

5. The apparatus of claim 1 wherein the inside diameter of the ring is approximately five and three-quarter inches and the outside diameter is approximately seven inches.

6. The apparatus of claim 5 wherein each of the teeth extends outward approximately three-sixteenth of an inch from the main body of the ring.

7. A method of weeding or cultivating comprising the steps of:
   (a) providing a flat annular ring which ring defines a plane, providing a sharpened outer edge for the rings with a plurality of sharp spaced peripheral teeth extending coplanarly outwardly therefrom and also providing the ring with an inner edge defining an opening surrounded by the ring;
   (b) providing an elongated handle and a means rigidly attached to the upper surface of the ring and also attached to the handle for attaching the handle to the ring, such that the handle is inclined at an angle of approximately 38 degrees relative to the plane of the ring and transmitting a force from the handle to the ring to force the outer edge to cut through the ground.
   (c) positioning and moving the handle and the attaching means to cause the plane of the ring to be slightly inclined relative to the surface of the ground and causing a portion of the outer edge to move slightly beneath the surface of the ground, moving the handle and the attaching means to cause the outer edge to move parallel to the surface of the ground and to cause the outer edge to cut through roots of weeds beneath the surface, and causing ground cut through by the outer edge to pass through the opening defined by the ring and be redeposited on the ground surface as the slightly inclined ring slices just beneath the surface of the ground, whereby roots of weeds are cut beneath the surface of the ground, and a surface layer of the ground is loosened, lifted, is passed through the opening in the ring, and is redeposited on the ground.

* * * * *